United States Patent [19]

Gardner

[11] Patent Number: 4,721,658
[45] Date of Patent: * Jan. 26, 1988

[54] AMORPHOUS MAGNETO OPTICAL RECORDING MEDIUM

[75] Inventor: Richard N. Gardner, Grant Township, Washington County, Minn.

[73] Assignee: Minnesota Mining and Manufacturing Company, St. Paul, Minn.

[*] Notice: The portion of the term of this patent subsequent to Feb. 11, 2003 has been disclaimed.

[21] Appl. No.: 874,083

[22] Filed: Jun. 13, 1986

Related U.S. Application Data

[63] Continuation of Ser. No. 599,669, Apr. 12, 1984, Pat. No. 4,615,944, which is a continuation-in-part of Ser. No. 495,175, May 17, 1983, abandoned.

[51] Int. Cl.$^4$ .............................................. G11B 7/24
[52] U.S. Cl. ................................... 428/694; 428/702; 428/900; 428/928
[58] Field of Search ............... 428/693, 692, 694, 900, 428/928, 702; 365/122; 360/131, 135; 369/288, 13

[56] References Cited

U.S. PATENT DOCUMENTS

| 3,427,154 | 2/1969 | Mader et al. | 75/134 |
|---|---|---|---|
| 3,472,575 | 10/1969 | Hunt | 350/151 |
| 3,514,766 | 5/1970 | Mee et al. | 340/174 |
| 3,530,441 | 9/1970 | Ovshinsky | 340/173 |
| 3,650,601 | 3/1972 | Bierlein | 350/151 |
| 3,651,281 | 3/1972 | Becker | 179/100 |
| 3,696,352 | 10/1972 | Schilling | 340/174 |
| 3,838,450 | 9/1974 | Bongers et al. | 360/59 |
| 3,949,387 | 4/1976 | Chaudhari et al. | 340/174 |
| 3,965,463 | 6/1976 | Chaudhari et al. | 340/174 |
| 4,042,341 | 8/1977 | Smeggil | 428/678 |
| 4,310,899 | 1/1982 | Biesterbos et al. | 365/113 |
| 4,347,112 | 8/1982 | Togami | 427/48 |
| 4,367,257 | 1/1983 | Arai et al. | 428/220 |
| 4,414,650 | 11/1983 | Ohta et al. | 365/122 |
| 4,438,508 | 3/1984 | Urner-Willie et al. | 365/122 |
| 4,497,870 | 2/1985 | Kudo et al. | 428/457 |
| 4,569,881 | 2/1986 | Freese et al. | 428/213 |

FOREIGN PATENT DOCUMENTS

| 3317101 | 11/1983 | Fed. Rep. of Germany | 5/62 |
|---|---|---|---|
| 3334923 | 3/1984 | Fed. Rep. of Germany | 11/10 |
| 3335689 | 4/1984 | Fed. Rep. of Germany | 13/6 |
| 56-143547 | 7/1981 | Japan . | |
| 56-146207 | 8/1981 | Japan . | |
| 6542 | 1/1983 | Japan . | |
| 2071696 | 9/1981 | United Kingdom . | |

OTHER PUBLICATIONS

Takenouchi, A. et al., "Magneto-Optical Characteristics of Double-Layered Amorphous RE-Fe Films by RF Sputtering", *J. Appl. Phys.*, Mar. 1984, pp. 2164-2166.

Sakurai, Y. et al., "RE-TM Amorphous Films for Magneto-Optical Recording", *IEEE Transactions on Magnetics*, Sep. 1983, pp. 1734-1736.

Kowalski, D. C., "High Data Rate Erasable Magneto-Optic Media Tester", Xerox Palo Alto Research Center.

Katayama, H. et al., "Study of High Reliability of the Magneto-Optic Medium with the Multi-Layer Structure", Sharp Corp., Nov., 1983.

(List continued on next page.)

*Primary Examiner*—George F. Lesmes
*Assistant Examiner*—William M. Atkinson
*Attorney, Agent, or Firm*—Donald M. Sell; James A. Smith; Douglas B. Little

[57] ABSTRACT

A magneto optical thin film recording medium is disclosed having very high carrier-to-noise ratios and high rotation angles. A transmission electron microscope photomicrograph (at 200,000×) of one such medium is shown in FIG. 1. These are multi-phase amorphous materials having magnetic anisotropy perpendicular to the plane of the thin film. They are produced in a triode vacuum sputtering process at vacuums in the range of $4 \times 10^{-3}$ to $6 \times 10^{-4}$ Torr. By adjusting process parameters such as substrate temperature, anode bias and deposition rate, the properties of the thin film can be altered.

3 Claims, 5 Drawing Figures

OTHER PUBLICATIONS

Takahashi, A. "Magneto-Optic Properties of GdTbFe Thim Films", Sharp Corporation, Nov., 1983.

Nomura, T., "Recent Trends in Magneto Optic Disk", *Technocrat*, Mar., 1983.

$O_2$ Contaminated Amorphous Fe Gd Films, J. Schneider et al., *J. App. Phys.*, 49(3), Mar., 1978, p. 1747.

Mansuripur, M., et al., "Optimum Disk Structures and Energetics of Domain Formation in Magneto Optical Recording", *IEEE Transaction on Magnetics*, Nov., 1982.

Togami, Y., et al., "Amorphous Thin Film Disk for Magneto Optical Memory", *SPIE Optical Disk Technology*, 1982.

Honda, S., et al., "Dynamic Behavior of Small Bits Written by Laser Irradiation on GdFe Films", *J. Appl. Phys.*, Mar., 1981.

Mimura, Y., et al., "Thermomagnetic Writing on GdFe and GdFe-Y Amorphous Films", *Japanese Journal of Applied Physics*, Aug., 1978.

Imamura, N., "Research Applies Magnetic Thin Films and the Magneto-Optical Effect in Storage Devices", *Journal of Electronic Engineering*, pp. 100–103, Mar., 1983.

Imamura, N., "The Development of Magneto-Optical Disk Memory with Semiconductor Lasers", KDD Research Development Laboratory, Jan. 17–20, 1983.

Bell., A. E., "Optical Data Storage", *Laser Focus*, Jan., 1983.

Ohta, K., et al., "Magneto-optical Disk with a Reflecting Layer", Optical Data Storage Conference at Incline Village, Nevada, Jan. 17–20, 1983.

Allen, R. and Connell, G. A. N., "Magneto-Optical Properties of Amorphous Terbium-Iron", *J. Appl. Phys.*, Mar. 1982, pp. 2353–2355.

Togami, Y., et al., "Amorphous GdCo Disk for Thermomagnetic Recording", *J. Appl. Phys.*, Mar., 1982, pp. 2335–2337.

Chen, Tu, et al., "Thickness Dependence of Magneto-Optical Effects in Tb-Te Film", Optical Storage Date Conference at Incline Village, Nev., Jan. 17–20, 1983.

Mansuripur, M., et al., "Signal-to-Noise in Magneto-Optic Storage", SPIE vol. 329, Optical Disk Technology, 1982, pp. 215–222.

Connell, G. A. N., "Interference Enhanced Kerr Spectroscopy for Very Thin Absorbing Films", *Applied Physics Letter*, Feb., 1982.

Gambino, R. J. and Cuomo, J. J., "Selective Resputtering-Induced Anisotropy in Amorphous Films", *J. Vac. Sci. Technol.*, Mar./Apr., 1978, pp. 296–301.

Structure of Argon Sputtered Gd-Co and Gd-Co-Mo Amorphous Thin Films", J. Graczyk, *J. App. Phys.*, 49(3), Mar., 1978, p. 1738.

AMORPHOUS MAGNETO OPTICAL RECORDING MEDIUM

This is a continuation of application Ser. No. 599,669, filed Apr. 12, 1984 now U.S. Pat. No. 4,615,944 which is a continuation-in-part of application Ser. No. 495,175 filed May 17, 1983 now abandoned.

TECHNICAL FIELD

This invention relates to amorphous thin film magnetic materials. More particularly, it pertains to magnetic compositions having magnetic anisotropy, whereby the thin film possesses a stable magnetic easy axis perpendicular to the plane of the film itself. These compositions can be used as light modulators, in which light interacting with the thin film is affected by the presence of a magnetic domain at the incident spot.

BACKGROUND

Magneto-optic recording media are also known by several other names: thermomagnetic media, beam addressable files, and photo-magnetic memories. All of these terms apply to a storage medium or memory element which responds to radiant energy permitting the use of such energy sources as laser beams for both reuse and interrogation. Such media modify the character of an incident polarized light beam so that the modification can be detected by an electronic device such as a photodiode.

This modification is usually a manifestation of either the Faraday effect or the Kerr effect on polarized light. The Faraday effect is the rotation of the polarization plane of polarized light which passes through certain magnetized media. The Kerr effect is the rotation of the plane of polarization of a light beam when it is reflected at the surface of certain magnetized media.

Magneto optic recording media have several advantages over known magnetic recording media:

1. The spacing between the medium and the recording head is greater, thus reducing potential for contact and wear;
2. Using a pulsed laser beam as the writing means, very high density data storage is possible.
3. With an interference layer on top of a magneto optic layer, the medium is affected less by dust than magnetic media.

In magneto optical recording, data is written into a medium having a preferentially directed remanent magnetization by exposing a localized area (spot or bit) on the recording medium to an electromagnetic or other energy source of sufficient intensity to heat the recording medium above its compensation or Curie point temperature and simultaneously biasing the medium with a magnetic field. Preferably, the energy source is a laser which produces a monochromatic output beam. The magnetic field required to reverse the magnetization of the recording medium varies with the temperature to which the recording medium is brought. Generally speaking for a given material, the higher the temperature, the smaller the required magnetic field coercive force.

The write or record operation for both Curie point and compensation point writing is as follows:

1. The medium is initially in a demagnetized state having about equal numbers of magnetic domains with magnetization oppositely directed and perpendicular to the surface of the film. A domain will herein refer to the smallest stable magnetizable region; although, in common usage a domain is a uniformly magnetized region of any size. The medium may be subjected to a saturation magnetic bias field normal to the surface of the film in order to magnetize all the domains in one direction. Alternatively, a selected area of the medium may be magnetized by exposing said area to a continous light beam and a small magnetic bias field.

2. A small magnetic bias field oriented perpendicular to the surface or plane of the film, but oppositely directed to the magnetic field applied earlier is applied over the entire thin film medium.

3. With the biasing field in place, a light beam from a radiant energy source such as a laser beam is directed toward a selected location or bit on the film where it causes localized heating of the film to a temperature at or above the compensation temperature. When the laser beam is removed, the bit cools in the presence of the biasing magnetic field and has its magnetization switched to that direction. The medium, in effect, has a magnetic switching field which is temperature dependent. The magnetic biasing field applied to the irradiated bit selectively switches the bit magnetization, with the bit momentarily near its compensation temperature under the influence of the laser. The momentary temperature rise reduces the bit coercive force.

In the write operation, the write laser beam (e.g. about 8–12 mW) is focused to the desired diameter (e.g. 1.0 microns) on the surface of the recording medium by an objective lens.

The memory element or recorded bit is interrogated, or read, nondestructively by passing a low-power (e.g. 1–3 mW) beam of polarized light (e.g. a laser beam) through the bit storage site for a sufficiently short time so as not to heat the medium to change its magnetic state. The read laser beam is normally shaped to a circular cross-section by a prism, polarized and focused to some small diameter (e.g. 1.0 microns) onto the recording medium by a lens. When the read beam has passed through the recorded spot, it is sent through an optical analyzer, and then a detector such as a photodiode, for detection of any change or lack of change in the polarization.

A change in orientation of polarization of the light is caused by the magneto-optical properties of the material in the bit or site. Thus, the Kerr effect, Faraday effect, or a combination of these two, is used to effect the change in the plane of light polarization. The plane of polarization of the transmitted or reflected light beam is rotated through the characteristic rotation angle $\theta$. For upward bit magnetization, it rotates $\theta$ degrees and for downward magnetization $-\theta$ degrees. The recorded data, usually in digital form represented by logic values of 1 or 0 depending on the direction of bit magnetization, are detected by reading the change in the intensity of light passing through or reflected from the individual bits, the intensity being responsive to the quantity of light which is rotated and the rotation angle.

Erasure can be accomplished by simply writing new information over old portions of the medium or by simply exposing any given bit with a laser beam of sufficient intensity and then cooling that bit in the presence of a magnetic field in the direction of the initially applied magnetic field. The entire storage medium can be erased by providing a large magnetic bias field in the original saturation direction which does not require a laser beam. Generally, in the recording process, the external biasing magnetic field is applied by a magnet set above or behind the magneto optic medium, and in the erasing process, the magnet is reversed in direction.

The signal-to-noise ratio (SNR) or carrier-to-noise ratio (CNR) of an erasable magneto optic medium is proportional to $\theta\sqrt{R}$, where R equals power reflectivity of the medium and $\theta$ is the angle of rotation. Forty-five decibels in a 30 kHz band width is generally considered the minimum CNR acceptable for direct read after write (DRAW) media. The speed at which the bits can be interrogated and the reliability with which the data can be read depends upon the magnitude of the magneto-optical properties, such as the angle of rotation, of the thin film and upon the ability of the interrogation system to detect these properties. An increase in the angle of rotation $\theta$ results in an increase in CNR.

For purposes of this discussion, the noise floor or noise level is measured at the average noise level.

The main parameters that characterize a magneto optic material are the angle of rotation, the coercive force ($H_c$) the Curie temperature and the compensation point temperature. The medium is generally comprised of a single element or multicomponent system where at least one of the components is an amorphous metal composition. Binary and ternary compositions are particularly suitable for these amorphous metal alloys. Suitable examples would be rare earth-transition metal (RE-TM) compositions such as: Gadolinium-cobalt (Gd-Co), Gadolinium-iron (Gd-Fe), Terbium-iron (Tb-Fe), Dysprosium-iron (Dy-Fe), Gd-Tb-Fe, Tb-Dy-Fe, Tb-Fe-Co, Terbium-iron-chromium (Tb-Fe-Cr), Gd-Fe-Bi (Bismuth), Gd-Fe-Sn (Tin), Gd-Fe-Co, Gd-Co-Bi, and Gd-Dy-Fe.

Japanese patent publication No. 56/143547 discloses a magneto optic medium of the type just discussed. It comprises a thin film of gadolinium-terbium-iron alloy in a ratio of 0.24/0.18/1 which film is more than 1000 angstroms thick when using the Kerr effect and 500 to 800 angstroms thick when using the Faraday effect. The film of this patent also has a 5400 angstrom thick glass (silicon dioxide) film on top of the Gd:Tb:Fe film.

The magneto optic amorphous thin films can be fabricated by known thin film deposition techniques, such as sputtering, evaporation and splat cooling. In splat cooling a hot liquid of the film constituents is incident on a cool surface where they are quenched and solidified rapidly to form an amorphous bulk film. Generally, no matter what deposition rate is used, the substrate temperature must be less than that at which crystallization occurs in order to provide amorphous magnetic materials.

The preferred process for thin film deposition is sputtering. Typical known sputtering conditions for amorphous thin films are: initial vacuum less than $1\times10^{-5}$ Torr; sputtering pressure of from $3\times10^2$ to $2\times10^{-2}$ Torr; pre-sputtering of a sputtering source of material to clear the surface thereof; substrate temperature of 30° to 100° C.; and an argon partial pressure.

In the cathodic sputtering process, argon gas ions bombard the solid alloy target cathode in the sputtering chamber dislodging metal atoms by transferring the momentum of the accelerated ions to the metal atoms near the surface of the target. The cathode is said to glow, and the mass of ionized gas between the cathode and the anode is a plasma. The substrate is placed at the anode, and the metal alloy atoms traverse the space between the anode and cathode to deposit or condense on the substrate.

The object of this invention is to enable the manufacture of a magneto optic medium which has a carrier-to-noise ratio of at least 45 decibels and has an excellent quality of interaction between the medium and the optical system to take advantage of the inherent quality of the medium. This involves not only maximizing theta, but also decreasing the intensity of the inherent noise level in the medium.

DISCLOSURE OF INVENTION

The present invention provides a new erasable magneto optical recording medium comprising a magnetizable, amorphous film, said film having a magnetic anisotropy perpendicular to the film surface, and said film being characterized by having a multiplicity of magnetic domains substantially all of which have a domain size of less than 500 angstroms in largest dimension. Domain size as used herein means the greatest dimension of the domain measured in the plane of the film. These films comprise a material composition containing an element with an unpaired electron, typically an alloy of at least one rare earth element and at least one transition metal. This magnetizable amorphous film enables the manufacture of media having a characteristic carrier-to-noise ratio of at least 47 decibels.

Although the magnetizable film is amorphous, it has different phases, which are defined as localized variations in density and/or composition within the film. The existence of different phases adjacent to one another is believed to give rise to perpendicular anisotropy. This property makes it possible to magnetize a bit in the direction opposite that of the film adjacent to it.

The characteristic magneto-optic angle of rotation of the magneto optic film, theta, is at least 0.24 degrees when measured with a helium neon laser at a wave length of 6328 angstroms and at least 0.4° measured with a laser diode at a wavelength of about 7800 to 8500 angstroms.

Many film substrates can be used. They may be formed of any material which is dimensionally stable, minimizing radial displacement variations during recording and playback. Semiconductors, insulators, or metals can be used. Suitable substrates include glass, spinel, quartz, sapphire, aluminum oxide, metals such as aluminum and copper, and polymers such as polymethyl-methacrylate and polyester. The substrate is typically in the form of a disc.

This medium can be incorporated into a multi-layer construction, wherein it is sandwiched between optical inteference layers. The resulting observed effective magneto optic rotations of polarized light with the sandwich construction (in the range of 1° to 10°) are relatively large and represent an improvement over values of theta reported for rare earth transition metal (RE-TM) multi-layer constructions in the literature.

The above-described erasable optical recording medium also has more precise bits (i.e. less average bit roughness) than known media, due to the smaller size of the domains (usually about 100 angstroms). Bits are typically 1 to 5 microns in longest dimension.

Although a Kaufman source or duoplasmatron could be used, the triode sputtering process is preferred for depositing the inventive amorphous thin films. Under ordinary, higher pressure cathodic sputtering conditions, the sputtered atoms lose kinetic energy through collision with gas molecules. The deposition rate is inversely proportional to sputtering pressure and the distance between the receiving surface and the cathode.

Triode sputtering, in addition to the main anode and cathode, has a thermionic cathode (emitter) and anode which has the advantage that a plasma can be maintained at much lower pressures than a direct current glow discharge (even in a magnetic field or magnetron). The ability of a triode sputtering apparatus to maintain an argon plasma at very low vacuums permits the deposition of these thin films at vacuums in the range of $4\times10^{-3}$ to $6\times10^{-4}$ Torr. The metal atoms which diffuse across the space between the sputtering cathode and anode are able to strike the substrate at a higher energy than they would at a lower vacuum since there are fewer argon ions in the space to interfere with the motion of the metal atoms, giving a greater mean-free path.

With triode sputtering, there are also more nucleation sites on the substrate because of the statistically higher rate of bombardment by energetic film constituent (metal alloy) atoms. This is believed to lead to a magneto optic film having a smoother surface than otherwise would occur. This in turn, leads to a magneto optical recording medium in which the surface of the film yields a background noise level that is at least 50 decibels below the carrier level when a 2 milliwatt peak-to-peak laser beam modulated at about 5.0 megahertz is reflected from the unwritten medium moving at a linear velocity of about ten meters per second. For the media of this invention, background noise is usually at least 65 decibels below the carrier level under the conditions stated above.

Although the media of this invention are erasable, they may be used in the same application as write-once or non-erasable media.

BRIEF DESCRIPTION OF THE FIGURES

FIG. No. 1 is a transmission electron microscope photomicrograph at 200,000× of an amorphous metal alloy thin film magneto optical medium of this invention.

FIG. No. 2 is an electron beam diffraction pattern of an amorphous metal alloy magneto optical thin film medium of the invention.

Figure 2:
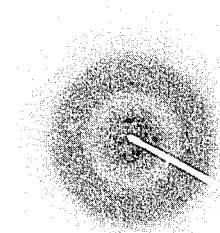

FIG. No. 3 is a profile of the electron beam diffraction pattern for the inventive magneto optic medium in FIG. 2.

FIG. No. 4 is a set of magnetic hysteresis loops for magneto optic films of this invention.

FIG. No. 5 is a set of optical hysteresis loops for magneto optic films of this invention.

DETAILED DESCRIPTION OF THE INVENTION

Figure 1:
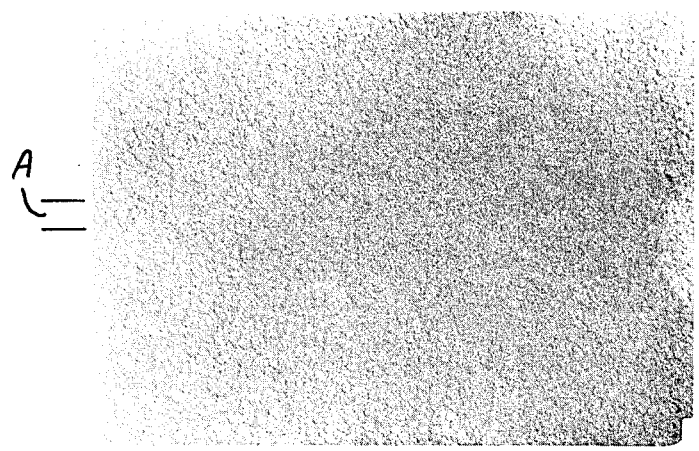

The good performance characteristics of these media (high $\theta$ and CNR) are thought to be attributable to physically identifiable features in the media. The two features believed to be most important are the existence of small domains and the optical constants of the recording medium (high refractive index and low extinction coefficient). Index of refraction (n) and extinction coefficient (k) for a gadolinium-terbium-iron alloy film of this invention have been determined to be 4.5 and 1.8 respectively. Domain size is preferably less than 200 angstroms in largest dimension. Thus, a one micrometer bit can be made up of many magnetized domains. FIG. 1 indicates domain boundary walls of 200 angstroms or less in largest dimension.

Domain formation in magnetic materials is well known. However, the teachings of the prior art lead to the conclusion that as domain size decreases into the extremely small range of this invention, the domains would be unstable. A bit comprised of unstable domains will generally undergo observable changes within about two minutes after it has been recorded, such as changes in location on the medium, CNR and bit size. A loss in CNR can indicate increased bit edge roughness. Stable bits are needed in order to maintain the integrity of recorded data for long periods.

A 5¼ inch (133 mm) diameter disc medium having a Gd-Tb-Fe amorphous alloy film of this invention coated thereon was tested for stability by recording a series of bits at 9 milliwatts laser power using a bias magnetic field of about 250 Oersteds (Oe). The recorded bits were read at 3.0 milliwatts laser power immediately after recording and about 14 days later. Within the limits of experimental error there were no changes in CNR, bit size or read signal amplitude between the two readings, indicating good bit and domain stability. Recorded bits on the inventive media have been stable for months.

The magnetizable amorphous film of the media herein described contains an element having an unpaired electron. One amorphous alloy composition particularly well-suited to this invention is gadolinium-terbium-iron ternary alloy. The composition range preferred is 6–15 atom percent gadolinium, 10–20 percent terbium and 65–84 percent iron. One composition made in the course of this invention was about 14% Gd, 17% Tb and 69% Fe. The Curie point temperature of this medium is about 120° C. The thin films made of this composition are generally greater than 50 angstroms thick and have a coercivity sufficient to create a stable memory. At a minimum, this should be about 500 Oe, but a range of 2000 to 3000 Oe is generally used.

As shown by FIG. 2, which is an electron beam diffraction pattern of such a ternary alloy made on a 200 keV apparatus, these materials show a diffraction pattern with broad halos that are not easily assigned a crystalline structure. In diffraction patterns, amorphous character is indicated by line broadening to the point where individual lines overlap. A broadened ring or fuzzy area which is divided by a concentric line is known as a split ring and indicates some short range ordering in the amorphous character of the film.

The information from the photographic image of the diffraction pattern can be translated to a profile plot of the diffracted intensity versus distance from the center of the diffraction pattern to give a more precise indication of amorphous character. The profiles of amorphous materials lack distinct peaks; whereas, those of crystalline materials have a number of quite distinct peaks indicating the lattice spacing or spacing between the atomic orbitals within the lattice.

As explained before, a triode sputtering process is suitable for depositing the magneto optic films of this invention. In the experiments by which this process was reduced to practice, the argon used for the sputtering was ultrahigh purity, (99.999 percent minimum purity). Argon flow rate into the triode sputtering apparatus was about 50 standard cubic centimeters per minute (scc/min), at a pressure of about 1.3 milli-Torr (which implies about 3 parts per million of gas present in the system). This represents a decrease in the presence of oxygen present in and flushed through the system by a multiple of at least 20 to 100 times less than ordinary direct current or radio frequency cathode sputtering.

The triode sputtering apparatus comprises a vacuum chamber containing a sputtering cathode target where the metal alloy is placed. The alloy sputters to provide an accumulation on the substrate which is placed on the anode substrate holder. The anode is held at a low negative bias voltage with respect to the chamber wall. The cathode target is water cooled, and the substrate can be made to rotate through an external drive means. A shutter is usually provided between the target and the anode to allow sputter cleaning of the substrate. Magnetically assisted triode sputtering is preferred, in which a magnetic field is imposed in line with the thermionic cathode and anode to confine the electrons to the plasma of ionizing gas and keep them away from the substrate where electron bombardment would cause heating. The sputtering chamber itself is made of stainless steel.

The optical properties of an amorphous thin film are a function of both the composition and the process by which the composition is formed or deposited. It is known that rare earth metals oxidize readily, and the control over this oxidation is an important part of the process of this invention to lead to a product of higher purity. If the anode is given a negative potential, with respect to the plasma, the resulting technique is referred to as bias sputtering. This bias is believed to cause a preferential removal of impurities such as oxygen from the main film by resputtering.

Radio frequency (RF) sputtering (rather than direct current) can be used to effect cleaning and to deposit insulators, such as transparent dielectric films. In this technique, a radio frequency alternating voltage is applied to the sputtering chamber by means of RF electrodes.

In operation, the sputtering chamber is typically pumped down to some initial background pressure (e.g. $4.0 \times 10^{-7}$ Torr) after which the sputter gas (argon) is introduced. Typically, the substrate is cleaned by pre-sputtering or sputter etching for about 60 seconds at a bias voltage of about 300 volts. The substrate is exposed to the flux of atoms from the target after the predetermined sputtering conditions have been reached. The deposition rate of the magneto optic film is generally 0.5 to 4.0 angstroms per second in the case of the gadolinium terbium iron ternary alloy. A thin film thermocouple is located near the anode substrate holder to measure the approximate substrate and equilibrium plasma temperature.

The higher vacuum of the triode apparatus appears to result in thin films of higher density and higher index of refraction than known magneto optic films such as those of U.S. Pat. No. 3,965,463.

It has been observed that the character of the magneto optic film at its surface can be different from the bulk properties of the film. This has been particularly evident in comparing coercivity measurements for the surface and the bulk of an unpassivated film. $H_c$ (coercivity) has been found to vary by an order of magnitude in extreme cases. These changes are especially important in an optical memory system, since the interaction of the read optical beam and the RE-TM storage materials occurs in the first 150 to 200 angstroms of the film. Oxidation of the rare earth is suspected of being the main cause of changes in the characteristics of thin film at the surface.

Passivation is the change of a chemically active metal surface to a much less reactive state. By coating the RE-TM films with a passivation layer, typically consisting of less than 300 angstroms thick of $SiO_x$, (x less than 2) the change in characteristics with time has been nearly eliminated, and higher magneto optic rotations have been measured than were previously obtained for RE-TM films without such a layer. This represents a significant increase in the stability of rare earth-transition metal magneto optical memory materials. Other materials useful for the passivating layer are: titanium dioxide, $SiO_2$, cerium oxide, aluminum oxide, and aluminum nitride.

A depth profile of elements in a sample of the inventive media having a Gd-Tb-Fe alloy film passivated by a covering of $SiO_x$ glass was made by Auger Electron Spectroscopy (AER) and by secondary ion mass spectroscopy (SIMS). The results indicated oxygen level in the Gd-Tb-Fe film of less than one atom percent. Electron Spectroscopy for Chemical Analysis (ESCA) has shown the $SiO_x$ films deposited over the Gd-Tb-Fe films to have x of 1.2–1.6 or an oxygen content of 55–62 atom percent. Depth profile analysis shows oxygen level within the Gd-Tb-Fe films to be about 200 times less than it is in the $SiO_x$, or by implication about 0.3 atom percent.

This invention will be further clarified by considering the examples which will follow in this description. They are intended to be purely exemplary.

EXAMPLE I

A magneto optic film of a specified thickness was deposited on a reflector. This bi-layer was then overcoated with a third layer of $SiO_x$ dielectric. The choice of the reflector generally relates to its efficiency of reflectivity at the wavelength of interest. The thickness of the magneto optic film will be dependent upon its optical properties as observed at the wavelength of the light of interest. The magneto optic material must be semi-transmissive in order to obtain increases in rotation from both the Faraday and Kerr effects. Films of Gd (11 atom percent) Tb (11 atom percent) with the balance being Fe (as determined by X-ray fluorescence) were deposited on copper coated (reflective layer) and uncoated plain glass slides. The angle of rotation, theta, was measured both with a helium neon (HeNe) laser, (wavelength 6328 angstroms) and a laser diode (L.D. wavelength 8300 angstroms). The results are given in Table 1 below.

TABLE 1

| Sample Number | Substrate | | Magneto-Optic Film Thickness | SiOx Thickness | Rotation HeNe | Angle L.D. |
|---|---|---|---|---|---|---|
| | Cu Coated Glass | Uncoated Glass | | | | |
| 132 | X | | 385Å | 270 | 0.27 | 0.47 |
| 139 | X | | 385Å | 950 | 1.12 | 1.10 |
| 138 | X | | 385Å | 1025 | 1.32 | 1.37 |
| 140 | X | | 385Å | 1065 | 1.27 | 1.55 |
| 145 on 144 | X | | 385Å | 1100 | .45 | 1.71 |
| 141 | X | | 385Å | 1200 | 1.21 | 1.69 |
| 142 | X | | 385Å | 1240 | 0.87 | 1.96 |

TABLE 1-continued

| Sample Number | Substrate Cu Coated Glass | Substrate Uncoated Glass | Magneto-Optic Film Thickness | SiOx Thickness | Rotation HeNe | Angle L.D. |
|---|---|---|---|---|---|---|
| 143 | X | | 385Å | 1300 | 0.45 | 1.73 |
| 130 | X | | 300Å | 300 | 0.36 | 0.47 |
| 129 | X | | 300Å | 435 | 0.35 | 0.44 |
| 128 | X | | 300Å | 610 | | 0.70 |
| 126 | X | | 300Å | 740 | | 0.85 |
| 133 | X | | 300Å | 878 | 1.75 | 1.21 |
| 137 | X | | 300Å | 950 | 1.30 | 1.43 |
| 134 | X | | 300Å | 1010 | 0.86 | 1.68 |
| 136 | X | | 300Å | 1050 | 0.99 | 1.55 |
| 135 | X | | 300Å | 1195 | 0.68 | 1.48 |
| 132 | | X | 385Å | 270 | 0.08 | 0.17 |
| 139 | | X | 385Å | 950 | 0.18 | 0.23 |
| 138 | | X | 385Å | 1025 | 0.41 | 0.29 |
| 140 | | X | 385Å | 1065 | 0.36 | 0.25 |
| 141 | | X | 385Å | 1200 | 0.24 | 0.18 |
| 142 | | X | 385Å | 1240 | 0.58 | 0.26 |
| 143 | | X | 385Å | 1300 | 0.47 | 0.54 |
| 130 | | X | 300Å | 300 | 0.04 | 0.11 |
| 129 | | X | 300Å | 435 | 0.06 | 0.17 |
| 128 | | X | 300Å | 610 | | |
| 126 | | X | 300Å | 740 | 0.01 | 0.11 |
| 133 | | X | 300Å | 878 | 0.03 | 0.12 |
| 137 | | X | 300Å | 950 | 0.31 | 0.12 |
| 134 | | X | 300Å | 1010 | 0.67 | 0.15 |
| 136 | | X | 300Å | 1050 | 0.19 | 0.16 |
| 135 | | X | 300Å | 1195 | 0.73 | 0.14 |
| 144 | X | | 385Å | 0 | 0.23 | 0.40 |
| 147 | X | | 970Å | 950 | 0.70 | 0.76 |
| 147 | | X | 970Å | 950 | 0.68 | 0.75 |

The thicknesses of the magneto optic film and the silicon suboxide film were measured by a double beam interferometer. These results indicate the dependence of rotation angle on both the thickness of the magneto optic film and that of the interference film. They also indicate the clear advantage of using a magneto optic film deposited over a reflector.

Various apparatus and methods are available and known to the art for reading data stored in magneto optic media, as is illustrated in U.S. Pat. No. 3,651,281 FIG. 3 and column 6 and 7. The same sort of arrangement may be used to test magneto optic media with some modifications. The basic testing apparatus comprises a laser diode emitting a beam which is directed by means of various dielectric mirrors, plano mirrors, polarizers, lenses and prisms to the magneto optic medium, and from there to a set of detectors which translate the intensity of the rotated light beam into an electronic signal. The laser diode emits a diverging beam at a wavelength about 8300 angstroms, which is polarized, modulated, collected and collimated by a lens and made circular by a prism. This circular beam is directed by mirrors through a focusing head onto the medium. By virtue of the combined Kerr and Faraday rotations, the plane of polarization of the light is rotated through angle theta. Upon reflection, all of the rotated light, as well as part of the non-rotated light, is directed onto a read path through polarizing beam splitters and toward photodiode detectors. Focusing of the read beam onto the medium can be done by imaging optics means (e.g, a TAOHS type 0.6 NA lens head from Olympus Co.)

A biasing magnet is located near the medium at the point where the beam strikes it. The bias field used in recording can influence carrier-to-noise ratio. However, as long as the bias field is more than about 300 Oersteds, CNR is relatively independent of bias field strength.

Figure 4:
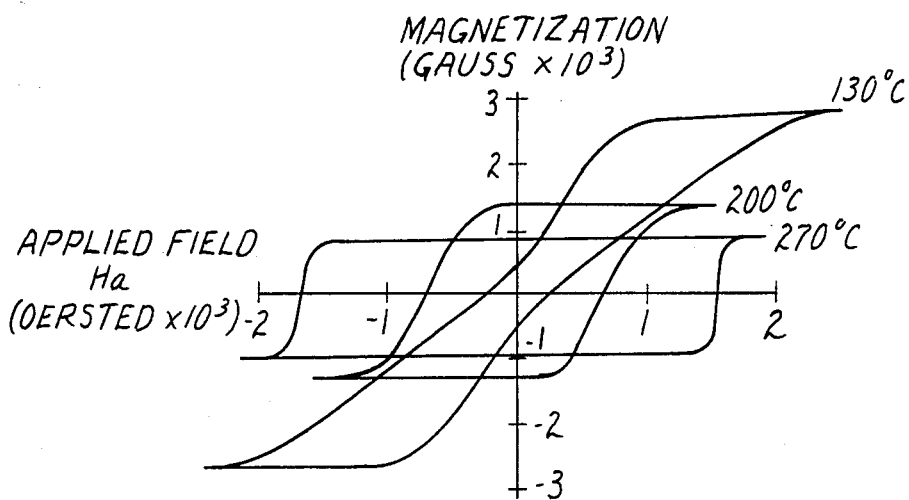
Figure 5:
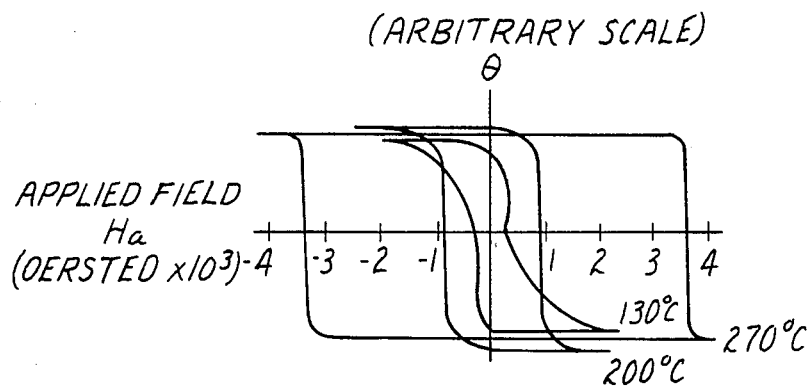

The triode sputtering process can be used to control several parameters of the final magneto optic film. The magnetic and optical hysteresis curves depicted in FIGS. 4 and 5 represent the characteristics of three gadolinium, terbium, iron alloy films produced by triode sputtering under 3 different conditions. The films were all of the same composition (13.5 percent gadolinium, 16 percent terbium and 70 percent iron), and they were all about 2000 angstroms thick. Film DC1 was sputtered on at 130° C.; DC2 at 200° C.; and DC11 at 270° C. It is the more rectangular hysteresis loops of Sample DC11 which are desired.

An additional series of experiments showed that a decreasing rare earth concentration results in an increased tendency to form a longitudinal component in the magneto optic film. An applied magnetic field around the target in the sputtering process also results in the formation of a longitudinally oriented medium. On the other hand, an increase in the deposition rate results in the suppression of the longitudinal component of the ternary alloy to some extent.

The different amorphous phases, which are necessary to the existence of domains adjacent to each other, appear to be dependent upon deposition rate, temperature, and film thickness.

Also, the anode or substrate bias has been found to be a useful control in the triode sputtering process. In one series of experiments, keeping all conditions the same except for substrate bias, which was varied from 0 volts to 623 volts, it was found that the rectilinearity of the magnetic hysteresis curve was increased substantially with increasing anode bias.

When a magnetizable amorphous film is deposited on a reflector, it is known that the magneto optic rotation is increased because the Faraday effect is added to the Kerr effect. The former effect rotates the plane of polarization of the light as it passes back and forth through the magneto-optic layer while the Kerr effect rotates it at the surface of the layer. Therefore, it is beneficial to deposit the magnetizable amorphous films on a substrate which has been reflectorized. Typical reflecting layers are copper, aluminum or gold.

The performance of these media may also be improved by interference enhancement. The read beam reflected from a magneto optic medium has a regular component $I_x$ and a magneto optically induced component $I_y$. The magnitude of the light rotation effect $I_y$ is determined both by the inherent properties of the medium and the ability to transmit the rotated radiation from the medium to some outside detecting means. This latter aspect is affected by optical interference layers. In addition to optical effects, an overlayer of transparent dielectric, such as glass, can reduce the effect of oxidation on the amorphous metal alloy. Such overlayers also reduce the effect of dust and impurities on the transmission of the read beam. These media are generally known as interference enhanced media. The recording sensitivity of the magnetic thin layer varies in response to the thickness of the dielectric interference layer covering it and also with the magneto optic amorphous alloy composition and the wave length of the incident light.

The dielectric anti-reflection coating on top produces some gain; however, further increases in the efficiency of conversion can be brought about by a tri-layer film in which the magneto optic film is deposited on a transparent dielectric film which itself rests on an opaque reflector. This intermediate dielectric layer ideally has a thickness of some integer multiple of $\lambda/4$, where $\lambda$ is the wavelength of the read beam light. When this condition is met, the rotated component ($I_y$) of the magneto optically induced light, which is emitted both forwards and backwards from the magneto optic thin film, is maximized by in phase addition of the exiting rays. An overlayer of a transparent anti-reflective dielectric film can also be used in conjunction with the intermediate layer. In this case, the structure is known as a quadrilayer structure.

EXAMPLE II

A polymerically subbed polished aluminum disc, having a diameter of 30 centimeters was provided. This disc had been made by coating a polished aluminum disc, which had been previously cleaned, with a polymer (e.g. styrene-butadiene polymer). A solution of the polymer (e.g. about 4% solids in a solvent with a boiling point greater than about 140° C.), had been applied to the disc (while it was spinning). The solvent was evaporated, leaving a thin polymeric subbing layer. The function of the subbing layer is to provide a very smooth surface for recording. The polymer should wet and adhere to the aluminum surface.

The subbed disc was coated with a priming layer of chromium oxide (to promote adhesion of the reflecting layer to the substrate) by magnetron sputtering using a chromium target in an atmosphere of argon, water vapor and air. The chromium oxide sputtering was continued for about one to two minutes at a target current of about 500 mA and a background operating pressure of about $2 \times 10^{-5}$ Torr, thereby obtaining a nucleation, adhesion-promoting layer of about 40 angstroms thick. Other suitable priming materials would be the oxides of titanium, tantalum and aluminum.

Over this, a reflecting copper layer about 1000 angstroms thick was applied by vacuum, resistance evaporation at a background pressure of about $2 \times 10^{-6}$ Torr. The substrate thus prepared was cleaned by sputter etching for about 60 seconds at a bias voltage of about 300 volts in the presence of argon. An intermediate glass film of silicon suboxide ($SiO_x$) was deposited from a silicon monoxide smoke source (obtained from RD Mathis Company in Long Beach, Calif.) to a thickness of about 250 angstroms by sputtering.

The triode sputtering method was then used to coat the prepared substrate with gadolinium, terbium, iron alloy. High-purity argon gas was leaked into the triode sputtering apparatus creating a background pressure of about $1.2 \times 10^{-3}$ Torr, and the deposition of the ternary alloy film was carried out under a substrate bias of about 300 volts and a target bias of about 300 volts. The deposition rate was in the range of 2.5 to 3 angstroms per second with a final film thickness of about 285 angstroms. At a vacuum of less than about $9.0 \times 10^{-7}$ Torr, a glass overcoat of about 1360 angstroms thick was deposited from an $SiO_x$ smoke source.

The alloy target used to create this magneto optic film was a mosaic of the desired constituents. Final composition of the deposited films was determined by energy dispersive X-ray fluoresence spectroscopy. The composition of the produced sample number 34-195 was determined to be 6.5 atom percent gadolinium, 10.0 percent terbium and 83.5 percent iron.

Table 2 indicates various magneto optic properties of Sample 34-195 and compares them to certain published values of known magneto optic media. All the data for sample 34-195 was recorded and read at a 115 mm radius on the disc.

TABLE 2

| Sample | 34-195 | 34-195 | 34-195 | 34-195 | 34-195 | 34-195 | 34-195 | Pub. 1 | Pub. 2 | Pub. 3 | Pub. 4 | Pub. 5 |
|---|---|---|---|---|---|---|---|---|---|---|---|---|
| Write laser Power (mW) | 6.0 | 7.0 | 8.0 | 9.0 | 10.0 | 11.0 | 12.0 | 8 | 6 | 6 | 5 | |
| Recording Frequency (MHz) | 2 | 2 | 2 | 2 | 2 | 2 | 2 | | | | | up to 2.5 |
| Magnetic bias field (Oe) | 600 | 600 | 600 | 600 | 600 | 600 | 600 | | | | | |
| Resolution Band Width Frequency (KHZ) | 30 | 30 | 30 | 30 | 30 | 30 | 30 | 30 | 30 | 30 | 30 | 30 |
| Read Laser Power (mW) | 2.0 | 2.0 | 2.0 | 2.0 | 2.0 | 2.0 | 2.0 | 2.5 | 2.5 | 2.5 | 2.5 | 2 |
| Carrier to Noise Ratio (dB) | 43.4 | 49.2 | 50.5 | 51.5 | 52.2 | 52.4 | 52.7 | 40 | 40 | 44 | 40 | 40 |
| Compensation Point (°C.) | 118 | 118 | 118 | 118 | 118 | 118 | 118 | 160 | 140 | 140 | 140 | |
| Disc speed (rpm) | 780 | 780 | 780 | 780 | 780 | 780 | 780 | 1350 | 1350 | 1350 | 1350 | 720 |

Samples Pub 1-4 are taken from Imamura, Nobutake, "The Development of Magneto-Optical Disc Memory With Semi-conductor Lasers", KDD Research and Development Laboratory, Tokyo, Japan, and the data for sample Pub-5 is taken from Bell, Alan E., "Optical Data Storage" *Laser Focus*, January, 1983.

FIG. 1 is a transmission electron microscope photomicrograph of the medium of sample 34-195 at 200,000×. The very small domain size is suggested by this photograph. The space between the hash marks A denotes a distance of 200 angstroms, and the small identifiable spots, believed to represent domains, appear smaller than distance A in largest dimension.

Figure 3:
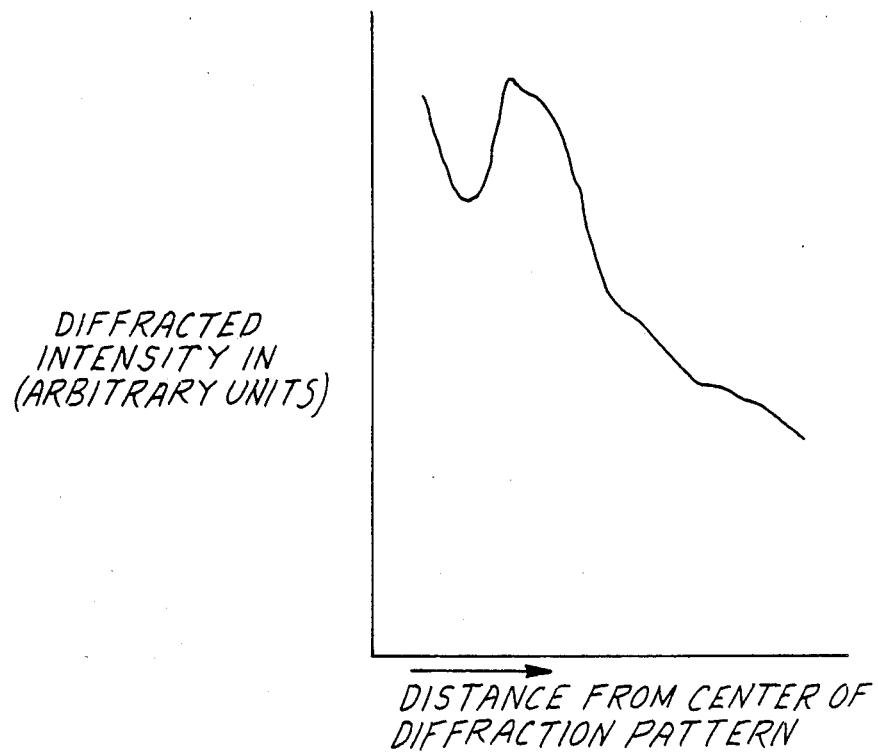

FIGS. 2 and 3 are the electron beam diffraction pattern and profile respectively for the medium of sample 34-195, showing its amorphous character.

Except for the carrier to noise ratio at the lowest write laser power of 6 milliwatts, the carrier-to-noise ratio of the inventive sample is significantly greater than that of the published media. It is felt that a CNR of at least 60 can be obtained using the techniques and materials described above.

EXAMPLE III

A sputtering target was made by placing terbium chips onto an iron target having an approximate area of 7742 mm². The chips were about 10 mm×25 mm in size, and the areal ratio used was 25.8% Tb to 74.2% Fe.

5¼ inch (133 mm) diameter polymethyl methacrylate (PMMA) discs were used as substrates. The discs were grooved and had a subbing layer made of 100% solids photopolymer cured with ultraviolet light. One substrate plus four slides (two PMMA and two glass) were loaded into the sputtering chamber, the disc being mounted on a rotating platen.

After pumping down the pressure to about $5.6 \times 10^{-7}$ mbar, $SiO_x$ was evaporated by resistance heating from a baffled source filled with silicon monoxide granules. It was deposited on the substrate at an average rate of about 5.5 Å/sec. to a thickness of about 400 Å. Pressure during $SiO_x$ evaporation was about $6.2 \times 10^{-7}$ mbar, and after evaporation it was about $7.3 \times 10^{-7}$ mbar.

The next step was to radio frequency sputter etch the $SiO_x$ just deposited. This was done in argon using 80 v for 30 seconds.

The triode sputtering apparatus was made ready for Tb-Fe sputtering. The argon flow was set at 28.6 sccm (standard cubic centimeters per second) while the triode emitter was warming up. The triode was stable with argon pressure at $1.3 \times 10^{-3}$ mbar. The direct current (d.c.) bias power supply was turned on and warmed up to a constant voltage of 300 v and a current of 0.69 amps. The target was shuttered during these operations to prevent premature deposition. The triode operated in this warmed up state for about 30 seconds. The radio frequency substrate bias was turned on and adjusted to 80 v with 30 seconds duration.

At this point, the shutter covering the Tb-Fe target was opened and the radio frequency substrate bias adjusted to 200 v. The triode plasma supply operated at 5 amps and 49 v; target bias at a constant 0.69 amps at 300 v. d.c. The sputtering chamber pressure during sputtering was $1.3 \times 10^{-3}$ mbar. Average deposition rate was 1.5–2.0 Å/sec, and deposition of the Tb-Fe was terminated when the Tb-Fe film thickness was about 275 Å. Chamber pressure after this termination (gas flow off) was $5.2 \times 10^{-7}$ mbar.

$SiO_x$ was then coated over the Tb-Fe layer by evaporation, as described previously, to a thickness of about 290 Å at a pressure of $4.6 \times 10^{-7}$ mbar. After a cool down time of about 30 minutes, the system was vented to dry nitrogen, opened up and the samples removed.

The disc and two of the slides (one plastic, one glass) were mounted onto a rotating substrate holder and placed in another vacuum chamber. After pumping down to a background pressure of $7.4 \times 10^{-7}$ Torr, $CrO_x$ primer was deposited over the second $SiO_x$ layer. Oxygen at a flow of 0.5 sccm and argon at 56 sccm were let into the vacuum chamber. The argon and oxygen pressure with the throttle valve closed was $3.3 \times 10^{-3}$. Deposition of $CrO_x$ by magnetically assisted diode sputtering from a chromium target proceeded for four seconds, giving a primer film thickness of about 100 Å.

Next a copper layer was deposited by resistance heating copper in a molybdenum boat. Background pressure was $8 \times 10^{-7}$ Torr. Copper was evaporated and deposited on the $CrO_x$ primer at an average rate of 40 Å/sec. up to a film thickness of about 1000 Å. Background pressure after copper deposition was $10^{-6}$ Torr.

A final $SiO_x$ layer was deposited over the copper layer by electron beam evaporation of silica granules. Background pressure was $8 \times 10^{-7}$ Torr. The $SiO_x$ was evaporated with the electron gun at 8 Kv and was deposited at a rate of about 15 Å/sec. to a total thickness of about 1200 Å.

The disk and slides were removed from the vacuum chamber, and analysis showed the magneto optic layer composition to be about 25 atom % Tb and 75% Fe. The following data were measured on the disc:

| | |
|---|---|
| specular reflectance at 820 nm wavelength (using a spectroradiometer) | 20.4% |
| Hc at room temperature | 2900 Oe |
| Dynamic tests | |
| CNR at write laser power of 9 mW | 52 |
| background noise level | 70 dB below carrier level |

EXAMPLE IV

The sputtering target as used in Example III was modified by placing eight cobalt chips, each being approximately 50 mm² in area, on the iron target surface between the previously described Tb chips. The areal ratios were 25.8% Tb, 67.2% Fe and 7% Co. The process was performed in a similar manner to Example III with the following exceptions:

In depositing the first $SiO_x$ film the sputtering apparatus was pumped down to $2.6 \times 10^{-6}$ mbar, and the $SiO_x$ film was deposited at about 5.4 Å/sec. to a thickess of about 800 Å. Pressure during evaporation was about $2.2 \times 10^{-6}$ mbar and $2.4 \times 10^{-6}$ mbar after evaporation.

In sputtering the Tb-Fe-Co layer: the d.c. target bias was warmed up to a constant current of 0.63 amps, triode plasma supply ran at 47 v; target bias was at 0.63 amps; and chamber pressure after termination of the Tb-Fe-Co film deposition was $2.1 \times 10^{-6}$ mbar.

The second $SiO_x$ coating step was at a pressure of $2.0 \times 10^{-6}$ mbar and deposited $SiO_x$ at 5.1 Å/sec.

The vacuum chamber was pumped down to a background pressure of $9 \times 10^{-7}$ Torr prior to CrOx deposition.

For the copper coating step, background pressure was $9 \times 10^{-7}$ Torr, and chamber pressure after deposition was $1.24 \times 10^{-6}$ Torr.

Background pressure for the deposition of the final $SiO_x$ layer was $9 \times 10^{-7}$ Torr.

Analysis showed the magneto-optic layer to have the following composition: 23% Tb, 66% Fe and 11% Co.

The following data were measure on the disc:
specular reflectance at 820 nm wavelength—14.1%
room temperature Hc—2600 Oe
Dynamic tests
  CNR at write laser power of 12 mW—about 53
  background noise level—67.4 dB below carrier level.

While certain representative embodiments and details have been shown for the purpose of illustrating the invention, it will be apparent to those skilled in this art that various changes and modifications may be made in this invention without departing from its true spirit or scope which is indicated by the following claims.

I claim:

1. A magneto-optical recording medium comprising a substrate and a passivated magnetizable amorphous film comprising a rare earth-transition metal alloy having a magnetic anisotropy perpendicular to the film surface and characterized by an oxygen concentration less than one atom percent, said magneto-optic recording medium having a Kerr rotation angle for polarized light reflected from the recording medium of at least 1.1° measured with a helium neon laser at a wavelength of 6328 angstroms and at least 1.1° measured with a laser diode at a wavelength of about 7800 to 8500 angstroms.

2. A magneto-optical recording medium comprising a substrate and a passivated magnetizable amorphous film comprising a rare earth-transition metal alloy having a magnetic anisotropy perpendicular to the film surface and characterized by an oxygen concentration less than one atom percent, said magneto-optical recording medium having a rotation angle for polarized light reflected from the recording medium of at least 1.1° measured with a helium neon laser at a wavelength of 6328 angstroms and at least 1.1° measured with a laser diode at a wavelength of about 7800 to 8500 angstroms.

3. A magneto-optical recording medium comprising a substrate, a passivated magnetizable amorphous film comprising a rare earth-transition metal alloy having a magnetic anisotropy perpendicular to the film surface and characterized by an oxygen concentration less than one atom percent, and a reflective surface on one side of the magnetizable amorphous film, said magneto-optic recording medium having a rotation angle for polarized light reflected from the recording medium of at least 1.1° measured with a helium neon laser at a wavelength of 6328 angstroms and at least 1.1° measured with a laser diode at a wavelength of about 7800 to 8500 angstroms.

* * * * *